US012687891B2

(12) United States Patent
Kim et al.

(10) Patent No.: US 12,687,891 B2
(45) Date of Patent: Jul. 21, 2026

(54) FLEXIBLE DISPLAY WINDOW AND ELECTRONIC DEVICE HAVING THE SAME

(71) Applicant: Samsung Electronics Co., Ltd., Suwon-si (KR)

(72) Inventors: Younggyun Kim, Suwon-si (KR); Heecheul Moon, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 23 days.

(21) Appl. No.: 18/672,680

(22) Filed: May 23, 2024

(65) Prior Publication Data

US 2024/0310880 A1      Sep. 19, 2024

Related U.S. Application Data

(63) Continuation of application No. 17/407,807, filed on Aug. 20, 2021, now Pat. No. 11,994,911, which is a
(Continued)

(30) Foreign Application Priority Data

May 2, 2016    (KR) ........................ 10-2016-0054196

(51) Int. Cl.
*G06F 1/16*           (2006.01)
*B32B 7/12*           (2006.01)
(Continued)

(52) U.S. Cl.
CPC .............. *G06F 1/1652* (2013.01); *B32B 7/12* (2013.01); *B32B 7/14* (2013.01); *B32B 17/00* (2013.01);
(Continued)

(58) Field of Classification Search
CPC ......... B32B 17/00; B32B 17/10; B32B 27/08; B32B 27/28; B32B 27/281; B32B 27/308;
(Continued)

(56) References Cited

U.S. PATENT DOCUMENTS

| | | | |
|---|---|---|---|
| 8,804,324 B2 | 8/2014 | Bohn et al. | |
| 8,804,349 B2 | 8/2014 | Lee et al. | |

(Continued)

FOREIGN PATENT DOCUMENTS

| | | |
|---|---|---|
| CN | 103827771 A | 5/2014 |
| CN | 203644006 U | 6/2014 |

(Continued)

OTHER PUBLICATIONS

Extended European Search Report dated Sep. 18, 2018, issued in a counterpart European application No. 16884010.6-1102/3347791.
(Continued)

*Primary Examiner* — Matthew A Eason
(74) *Attorney, Agent, or Firm* — Jefferson IP Law, LLP

(57)              ABSTRACT

A flexible display window and an electronic device having the same are provided. The electronic device includes a housing including a first rigid portion and a flexible portion, at least one outer layer that covers the first rigid portion and the flexible portion, a display device including a screen including a first portion exposed through the first rigid portion and a second portion extended from the first portion and exposed through the flexible portion, at least one processor electrically coupled to the display device, and a memory electrically coupled to the at least one processor, wherein the outer layer includes a polymer layer, a glass layer interposed between the polymer layer and the screen, and an adhesive layer interposed between the polymer layer and the glass layer.

18 Claims, 9 Drawing Sheets

Related U.S. Application Data continuation of application No. 16/870,229, filed on May 8, 2020, now Pat. No. 11,099,607, which is a continuation of application No. 16/285,963, filed on Feb. 26, 2019, now Pat. No. 10,691,173, which is a continuation of application No. 15/380,271, filed on Dec. 15, 2016, now Pat. No. 10,261,545.

(60) Provisional application No. 62/275,729, filed on Jan. 6, 2016.

(51) Int. Cl.

| | |
|---|---|
| *B32B 7/14* | (2006.01) |
| *B32B 17/00* | (2006.01) |
| *B32B 17/10* | (2006.01) |
| *B32B 27/08* | (2006.01) |
| *B32B 27/28* | (2006.01) |
| *B32B 27/30* | (2006.01) |
| *B32B 27/36* | (2006.01) |
| *B32B 27/38* | (2006.01) |
| *B32B 27/40* | (2006.01) |
| *G06F 3/044* | (2006.01) |

(52) U.S. Cl.
CPC .............. *B32B 17/10* (2013.01); *B32B 27/08* (2013.01); *B32B 27/28* (2013.01); *B32B 27/281* (2013.01); *B32B 27/308* (2013.01); *B32B 27/36* (2013.01); *B32B 27/365* (2013.01); *B32B 27/38* (2013.01); *B32B 27/40* (2013.01); *G06F 1/1626* (2013.01); *G06F 1/1637* (2013.01); *G06F 1/1641* (2013.01); *G06F 1/1643* (2013.01); *G06F 3/044* (2013.01); *B32B 2250/05* (2013.01); *B32B 2255/10* (2013.01); *B32B 2255/28* (2013.01); *B32B 2307/30* (2013.01); *B32B 2307/306* (2013.01); *B32B 2307/308* (2013.01); *B32B 2307/40* (2013.01); *B32B 2307/412* (2013.01); *B32B 2307/416* (2013.01); *B32B 2307/50* (2013.01); *B32B 2307/536* (2013.01); *B32B 2307/546* (2013.01); *B32B 2307/558* (2013.01); *B32B 2307/584* (2013.01); *B32B 2307/732* (2013.01); *B32B 2307/746* (2013.01); *B32B 2457/00* (2013.01); *B32B 2457/208* (2013.01); *G06F 2203/04102* (2013.01)

(58) Field of Classification Search
CPC ....... B32B 27/36; B32B 27/365; B32B 27/38; B32B 27/40; B32B 7/12; B32B 7/14; B32B 2250/05; B32B 2255/10; B32B 2255/28; B32B 2307/30; B32B 2307/306; B32B 2307/308; B32B 2307/40; B32B 2307/412; B32B 2307/416; B32B 2307/50; B32B 2307/536; B32B 2307/546; B32B 2307/558; B32B 2307/584; B32B 2307/732; B32B 2307/746; B32B 2457/00; B32B 2457/208; G06F 1/1626; G06F 1/1637; G06F 1/1641; G06F 1/1643; G06F 1/1652; G06F 3/044; G06F 2203/04102
See application file for complete search history.

(56) References Cited

U.S. PATENT DOCUMENTS

| | | | |
|---|---|---|---|
| 9,778,772 B2 | 10/2017 | Kauhaniemi et al. | |
| 9,798,359 B2 | 10/2017 | Seo et al. | |
| 9,811,119 B2 | 11/2017 | Seo | |
| 9,961,337 B2 | 5/2018 | Stroetmann | |
| 10,656,799 B2 | 5/2020 | Takesue | |
| 2007/0116948 A1 | 5/2007 | Kim et al. | |
| 2010/0062234 A1 | 3/2010 | Murashige et al. | |
| 2010/0068534 A1 | 3/2010 | Paul et al. | |
| 2011/0032205 A1 | 2/2011 | David | |
| 2011/0045996 A1 | 2/2011 | Yeo et al. | |
| 2011/0064943 A1 | 3/2011 | Wang | |
| 2012/0146946 A1 | 6/2012 | Wang et al. | |
| 2012/0262870 A1 | 10/2012 | Leung | |
| 2013/0010405 A1 | 1/2013 | Rothkopf et al. | |
| 2013/0050135 A1 | 2/2013 | Stewart et al. | |
| 2013/0083496 A1 | 4/2013 | Franklin et al. | |
| 2013/0286291 A1 | 10/2013 | Yanagida | |
| 2014/0030496 A1 | 1/2014 | Oh et al. | |
| 2014/0065326 A1 | 3/2014 | Lee et al. | |
| 2014/0111954 A1 | 4/2014 | Lee et al. | |
| 2014/0226275 A1 | 8/2014 | Ko et al. | |
| 2014/0295150 A1 | 10/2014 | Bower et al. | |
| 2014/0355195 A1 | 12/2014 | Kee et al. | |
| 2015/0004334 A1 | 1/2015 | Bae et al. | |
| 2015/0004345 A1* | 1/2015 | Chaung ..................... | C09J 5/06 428/189 |
| 2015/0153780 A1 | 6/2015 | Maatta et al. | |
| 2015/0207102 A1 | 7/2015 | Jeong et al. | |
| 2015/0248149 A1 | 9/2015 | Yamazaki et al. | |
| 2015/0266272 A1 | 9/2015 | Lee et al. | |
| 2015/0277496 A1 | 10/2015 | Reeves et al. | |
| 2015/0338944 A1 | 11/2015 | Maatta et al. | |
| 2015/0364718 A1 | 12/2015 | Huang et al. | |
| 2015/0366089 A1 | 12/2015 | Park et al. | |
| 2017/0045996 A1 | 2/2017 | Ka et al. | |
| 2017/0092892 A1 | 3/2017 | Zhang et al. | |

FOREIGN PATENT DOCUMENTS

| | | |
|---|---|---|
| JP | 2015-180993 A | 10/2015 |
| JP | 2015-228020 A | 12/2015 |
| KR | 10-2014-0033546 A | 3/2014 |
| KR | 10-2015-0024172 A | 3/2015 |
| KR | 10-2015-0099383 A | 8/2015 |
| KR | 10-2015-0142290 A | 12/2015 |
| WO | 2014/154933 A1 | 10/2014 |
| WO | 2015/082758 A1 | 6/2015 |

OTHER PUBLICATIONS

Extended European Search Report dated Aug. 20, 2020, issued in European Patent Application No. 20173276.5.
Korean Decision of Patent dated Feb. 9, 2021, issued in Korean Patent Application No. 10-2016-0054196.
Chinese Office Action dated Feb. 23, 2021, issued in Chinese Patent Application No. 201680077849.6.
Extended European Search Report dated Dec. 7, 2023; European Application No. 23186545.2-1102 / 4249237.
Indian Office Action dated Jan. 31, 2024; Indian Appln. No. 202138039611.
Chinese Office Action dated Aug. 17, 2022, issued in Chinese Patent Application No. 201680077849.6.
European Decision to Grant a Patent dated Oct. 28, 2022, issued in European Patent Application No. 20173276.5.
Korean Decision of Patent dated Nov. 29, 2021, issued in Korean Patent Application No. 10-2021-0055504.
Chinese Office Action dated Dec. 21, 2021, issued in Chinese Patent Application No. 202010371577.9.
Chinese Office Action dated Jan. 17, 2022, issued in Chinese Patent Application No. 201680077849.6.
European Search Report dated Jun. 13, 2023, issued in European Application No. 23163368.6.
Indian Office Action dated May 15, 2025; Indian Appln No. 202338060368.

\* cited by examiner

55

FLEXIBLE DISPLAY WINDOW AND ELECTRONIC DEVICE HAVING THE SAME

CROSS-REFERENCE TO RELATED APPLICATION(S)

This application is a continuation application of prior application Ser. No. 17/407,807, filed on Aug. 20, 2021, which was a continuation application of prior application Ser. No. 16/870,229, filed on May 8, 2020, which has issued as U.S. Pat. No. 11,099,607 on Aug. 24, 2021, which is a continuation application of prior application Ser. No. 16/285,963, filed on Feb. 26, 2019, which has issued as U.S. Pat. No. 10,691,173 on Jun. 23, 2020, which is a continuation application of prior application Ser. No. 15/380,271, filed on Dec. 15, 2016, which has issued as U.S. Pat. No. 10,261,545 on Apr. 16, 2019 and was based on and claimed priority under 35 U.S.C. § 119(e) of a U.S. Provisional application Ser. No. 62/275,729, filed on Jan. 6, 2016, in the U.S. Patent and Trademark Office, and under 35 U.S.C. § 119(a) of a Korean patent application number 10-2016-0054196, filed on May 2, 2016, in the Korean Intellectual Property Office, the disclosure of each of which is incorporated by reference herein in its entirety.

TECHNICAL FIELD

The present disclosure relates to a flexible display window and an electronic device having the same.

BACKGROUND

In general, for protection of a display located at a front surface, side surface, or rear surface or for a design, a transparent material (e.g., glass, polymer material (e.g., transparent resin material, transparent sheet material)) is applied to an electronic device. As the transparent material, glass is most widely used due to surface hardness and excellent optical performance.

Nowadays, interest in an electronic device including a flexible display module that may be bent (hereinafter, a flexible electronic device) has increased.

However, when applying a transparent material of a glass material to a front surface or a rear surface, the flexible electronic device has many problems. For example, the glass material has a low bending ability, and when forming the glass material of a thin thickness for a bending ability, the glass material may be easily broken. Further, because the glass material is weak when exposed to heat and/or moisture, it is difficult to implement a heterogeneous complex material by synthesizing the glass material with another material.

The polymer material is generally weak on surface hardness and scratch resistance, and when a flexible display module is located at a rear surface, there is a problem that the flexible display module is weak against pressing and stabbing. Further, because sensory sensitivity of the polymer material is deteriorated due to weak bending rigidity, there is a problem that a quality thereof is deteriorated.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a flexible display window and an electronic device having the same that simultaneously have characteristics of a glass material and a polymer material and that can apply to a flexible electronic device.

In accordance with an aspect of the present disclosure, an electronic device is provided. The electronic device includes a housing including a first rigid portion and a flexible portion, at least one outer layer that covers the first rigid portion and the flexible portion, a display device including a screen including a first portion exposed through the first rigid portion and a second portion extended from the first portion and exposed through the flexible portion, at least one processor electrically coupled to the display device, and a memory electrically coupled to the at least one processor, wherein the outer layer includes a polymer layer, a glass layer interposed between the polymer layer and the screen, and an adhesive layer interposed between the polymer layer and the glass layer.

In accordance with another aspect of the present disclosure, an electronic device is provided. The electronic device includes a housing including a first rigid portion, a second rigid portion, and a bendable portion connected between the first rigid portion and the second rigid portion and that may be completely bent such that at least a portion of the first rigid portion and the second rigid portion face each other, at least one outer layer that covers the first rigid portion, the second rigid portion, and the bendable portion, a display device including a touch screen including a first portion exposed through the first rigid portion, a second portion exposed through the second rigid portion, and a third portion exposed through the bendable portion, wherein the first portion is extended from one side of the third portion, and wherein the second portion is extended from the other side of the third portion, at least one processor electrically coupled to the display device, and a memory electrically coupled to the at least one processor, wherein the outer layer includes a polymer layer, and a glass layer interposed between the polymer layer and the touch screen and disposed over the first portion, the second portion, and the third portion of the touch screen.

In accordance with another aspect of the present disclosure, a flexible display window is provided. The flexible display window includes a polymer layer of a flexible and transparent material, a flexible glass layer, and an adhesive layer disposed between the polymer layer and the glass layer and that bonds the polymer layer and the glass layer.

As described above, according to various embodiments of the present disclosure, by improving impact resistance, strength, and bending rigidity of a flexible display window, a quality thereof can be improved. Further, according to various embodiments of the present disclosure, a flexible display window having high surface hardness (e.g., 2 hardness (H) or more) and scratch resistance can be provided. Further, according to various embodiments of the present disclosure, a thickness of a flexible display window can be reduced. Further, a flexible display window according to various embodiments of the present disclosure can be bent to 3 radius (R) (curved surface of a circle having a radius of 3 mm) or less. Thereby, a flexible display window according to various embodiments of the present disclosure can be applied to a foldable or flexible electronic device. Further, according to various embodiments of the present disclosure, a flexible display window having the same optical performance as that of a glass material can be provided. Further, according to various embodiments of the present disclosure, a flexible display window can be easily replaced.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
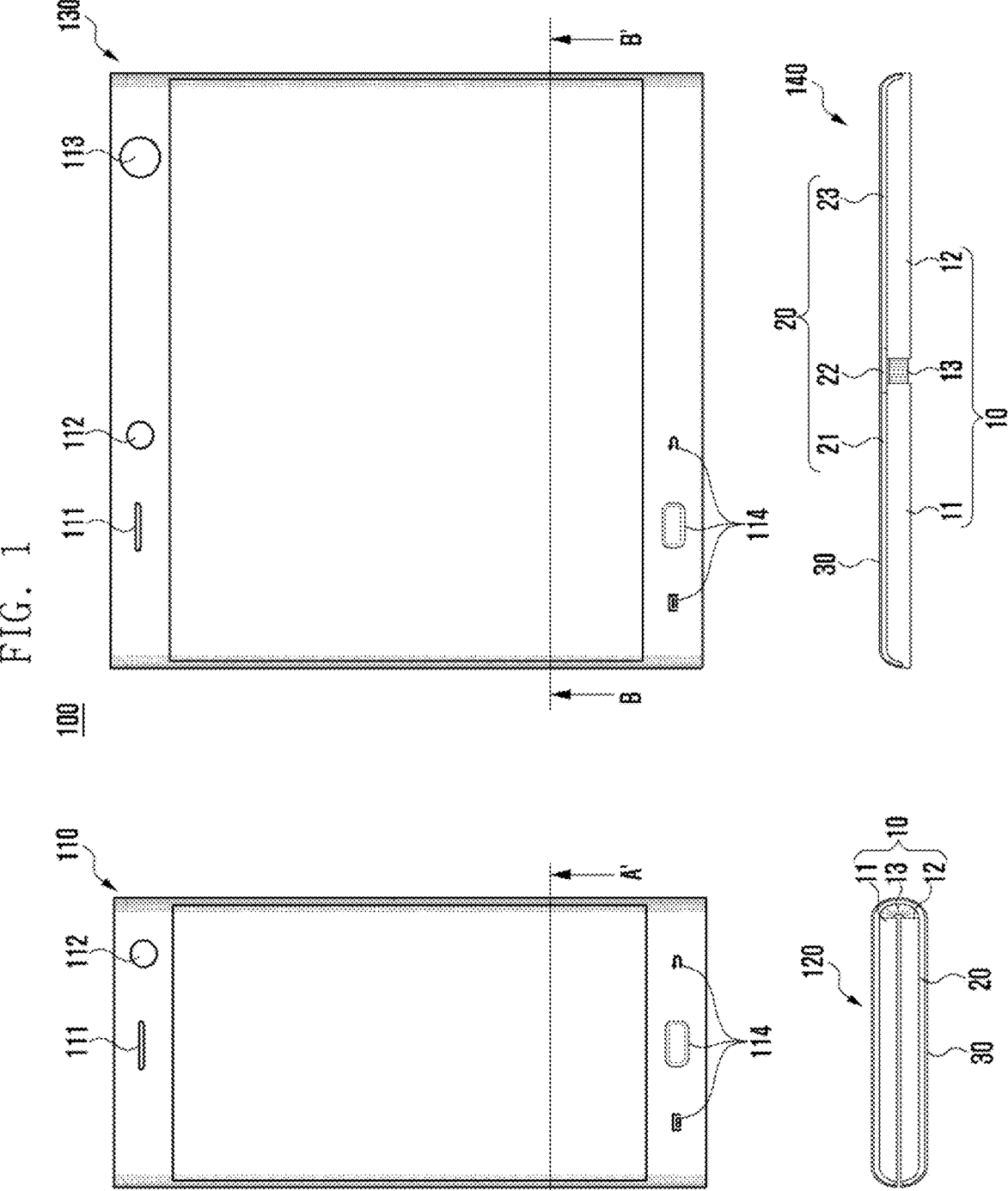
FIG. 1 is a diagram illustrating an electronic device according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The terms "A or B," "at least one of A or/and B," or "one or more of A or/and B" as used herein include all possible combinations of items enumerated with them. For example, "A or B," "at least one of A and B," or "at least one of A or B" means (1) including at least one A, (2) including at least one B, or (3) including both at least one A and at least one B.

The terms such as "first" and "second" as used herein may modify various elements regardless of an order and/or importance of the corresponding elements, and do not limit the corresponding elements. These terms may be used for the purpose of distinguishing one element from another element. For example, a first user device and a second user device may indicate different user devices regardless of the order or importance. For example, a first element may be referred to as a second element without departing from the scope the present disclosure, and similarly, a second element may be referred to as a first element.

It will be understood that, when an element (for example, a first element) is "(operatively or communicatively) coupled with/to" or "connected to" another element (for example, a second element), the element may be directly coupled with/to another element, and there may be an intervening element (for example, a third element) between the element and another element. To the contrary, it will be understood that, when an element (for example, a first element) is "directly coupled with/to" or "directly connected to" another element (for example, a second element), there is no intervening element (for example, a third element) between the element and another element.

The expression "configured to (or set to)" as used herein may be used interchangeably with "suitable for," "having the capacity to," "designed to," "adapted to," "made to," or "capable of" according to a context. The term "configured to (set to)" does not necessarily mean "specifically designed to" in a hardware level. Instead, the expression "apparatus configured to . . . " may mean that the apparatus is "capable of . . . " along with other devices or parts in a certain context. For example, "a processor configured to (set to) perform A, B, and C" may mean a dedicated processor (e.g., an embedded processor) for performing a corresponding operation, or a generic-purpose processor (e.g., a central processing unit (CPU) or an application processor (AP)) capable of performing a corresponding operation by executing one or more software programs stored in a memory device.

Electronic devices according to various embodiments of the present disclosure may include at least one of, for example, smart phones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group phase 1 or phase 2 (MPEG-1 or MPEG-2) audio layer 3 (MP3) players, mobile medical devices, cameras, or wearable devices. According to an embodiment of the present disclosure, the wearable devices may include at least one of accessory-type wearable devices (e.g., watches, rings, bracelets, anklets, necklaces, glasses, contact lenses, or head-mounted-devices (HMDs)), fabric or clothing integral wearable devices (e.g., electronic clothes), body-mounted wearable devices (e.g., skin pads or tattoos), or implantable wearable devices (e.g., implantable circuits).

The electronic devices may be smart home appliances. The smart home appliances may include at least one of, for example, televisions (TVs), digital versatile disc (DVD) players, audios, refrigerators, air conditioners, cleaners, ovens, microwave ovens, washing machines, air cleaners, set-top boxes, home automation control panels, security control panels, TV boxes (e.g., Samsung HomeSync™, Apple TV™, or Google TV™), game consoles (e.g., Xbox™ and PlayStation™), electronic dictionaries, electronic keys, camcorders, or electronic picture frames.

The electronic devices may include at least one of various medical devices (e.g., various portable medical measurement devices (such as blood glucose meters, heart rate monitors, blood pressure monitors, or thermometers, and the like), a magnetic resonance angiography (MRA) device, a magnetic resonance imaging (MRI) device, a computed tomography (CT) device, scanners, or ultrasonic devices, and the like), navigation devices, global positioning system (GPS) receivers, event data recorders (EDRs), flight data recorders (FDRs), vehicle infotainment devices, electronic equipment for vessels (e.g., navigation systems, gyrocompasses, and the like), avionics, security devices, head units for vehicles, industrial or home robots, automatic teller machines (ATMs), points of sales (POSs) devices, or Internet of things (IoT) devices (e.g., light bulbs, various sensors, electric or gas meters, sprinkler devices, fire alarms, thermostats, street lamps, toasters, exercise equipment, hot water tanks, heaters, boilers, and the like).

The electronic devices may further include at least one of parts of furniture or buildings/structures, electronic boards, electronic signature receiving devices, projectors, or various measuring instruments (such as water meters, electricity meters, gas meters, or wave meters, and the like). The electronic devices may be one or more combinations of the above-mentioned devices. The electronic devices may be flexible electronic devices. Also, the electronic devices are not limited to the above-mentioned devices, and may include new electronic devices according to the development of new technologies.

Hereinafter, the electronic devices according to various embodiments of the present disclosure will be described with reference to the accompanying drawings. The term "user" as used herein may refer to a person who uses an electronic device or may refer to a device (e.g., an artificial intelligence electronic device) which uses an electronic device.

FIG. 1 is a diagram illustrating an electronic device according to an embodiment of the present disclosure.

Referring to FIG. 1, an electronic device 100 according to the present embodiment may be a foldable electronic device that may be folded in at least one location. However, the present disclosure is not limited thereto. For example, the electronic device 100 according to the present embodiment may be a flexible electronic device.

A drawing of a reference numeral 110 of FIG. 1 illustrates a folded shape of the electronic device 100, and a drawing of a reference numeral 120 illustrates a cross-sectional view of the electronic device 100 taken along line A-A'. Further, a drawing of a reference numeral 130 of FIG. 1 illustrates an extended shape of the electronic device 100, and a drawing of a reference numeral 140 illustrates a cross-sectional view of the electronic device 100 taken along line B-B'.

With reference to the drawings of the reference numerals 110 and 130, the electronic device 100 may include a speaker 111, front camera 112, rear camera 113, and function keys 114. The function keys 114 may include a home key, cancel key, menu key. The function keys 114 may be formed with a physical button key, touch key, soft key, or a combination thereof. According to an embodiment, the electronic device 100 may further include an illumination sensor, volume key, and power key.

With reference to the drawings of the reference numerals 120 and 140, the electronic device 100 according to the present embodiment may include a housing 10, display device 20, and outer layer 30.

The housing 10 is a case that forms an external appearance of the electronic device 100. The housing 10 may be formed with a first rigid portion 11, second rigid portion 12, and flexible portion 13.

The first rigid portion 11 and the second rigid portion 12 are not bent and may be made of a hard material (e.g., an injection material or a metal material (e.g., aluminum)).

The flexible portion 13 is located between the first rigid portion 11 and the second rigid portion 12 to enable the electronic device 100 to be bent. For example, the flexible portion 13 may be completely bent such that the first rigid portion 11 and the second rigid portion 12 face, as shown in the drawing of the reference numeral 120. For example, the flexible portion 13 may be formed with a multi-joint hinge. The flexible portion 13 may be referred to as a bendable portion.

The display device 20 may display various screens for operation of the electronic device 100. The display device 20 may be bent. For example, the display device 20 may be bent as shown in the drawing of the reference numeral 120 or may be extended as shown in the drawing of the reference numeral 140. The display device 20 may include a first portion 21 exposed through the first rigid portion 11, a second portion 22 extended from the first portion 21 and exposed through the flexible portion 13, and a third portion 23 extended from the second portion 22 and exposed through the second rigid portion 12. According to an embodiment, the first portion 21 of the display device 20 may be located on the first rigid portion 11, the second portion 22 may be located on the flexible portion 13, and the third portion 23 may be located on the second rigid portion 12.

The display device 20 may be completely folded such that the first portion 21 and the third portion 23 are located at opposite sides, as shown in the drawing of the reference numeral 120. Alternatively, according to an embodiment, in the display device 20, the first portion 21 and the third portion 23 may be completely bent to face each other.

The display device 20 may be a touch screen. The touch screen may include at least one capacitive element and a sensing circuit that detects a pressure and/or a touch input occurring on a screen of the display device using the capacitive element.

The outer layer 30 may cover the first rigid portion 11 and the flexible portion 13. According to an embodiment, the outer layer 30 may cover at least a display device 20. According to an embodiment, the outer layer 30 may cover a rear surface or a side surface of the electronic device 100.

The outer layer 30 may be made of a transparent material. For example, the outer layer 30 may be formed by adhering a polymer sheet (polymer layer) and a glass sheet (glass layer). A detailed description of the outer layer 30 will be descried later with reference to FIG. 2.

The electronic device 100 of FIG. 1 is an example, and the present disclosure is not limited thereto. For example, FIG. 1 illustrates that the electronic device 100 is folded using a vertical direction as a shaft at an intermediate point of a horizontal direction, but the electronic device 100 may be folded at a plurality of locations (e.g., at ¼ point and ¾ point of a horizontal direction). Further, according to an embodiment, the electronic device 100 may be folded using a horizontal direction as a shaft in at least one point of a vertical direction.

Figure 2:
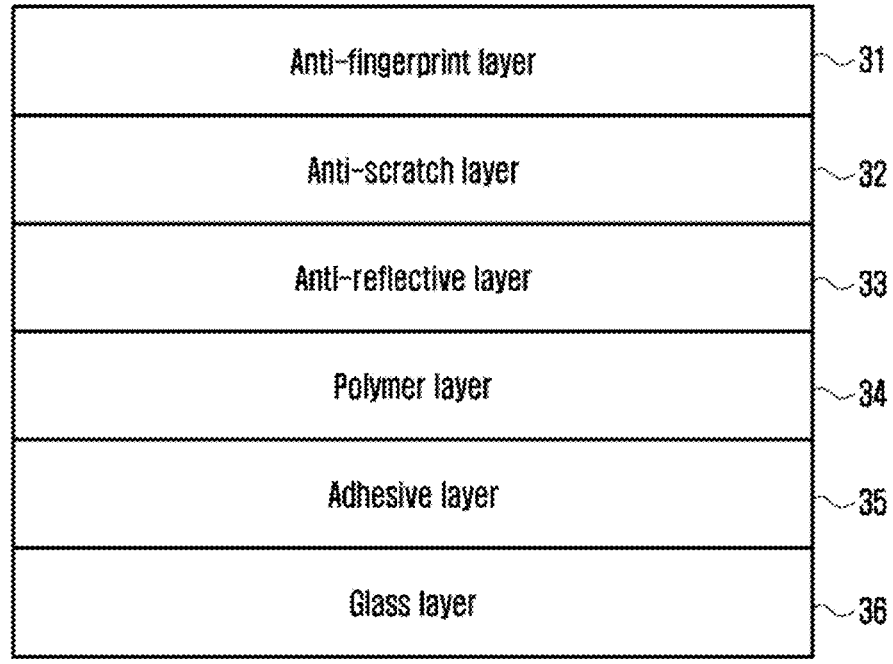
FIG. 2 is a diagram illustrating a structure of an outer layer according to an embodiment of the present disclosure.
Figure 3:
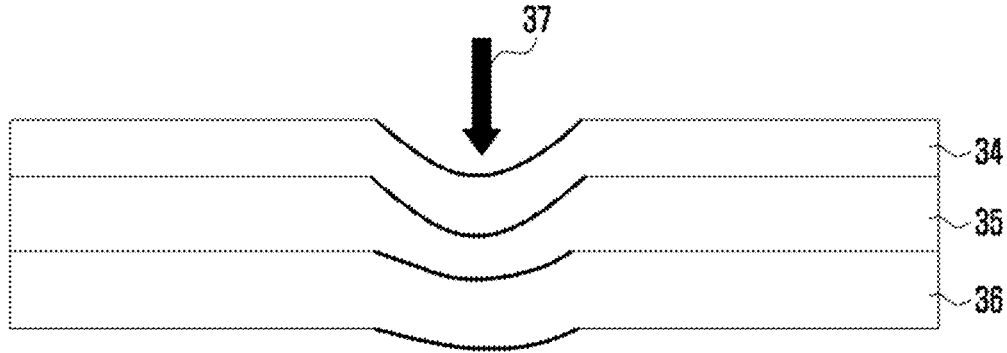
FIG. 3 is a diagram illustrating prevention of damage of an outer layer by an impact according to an embodiment of the present disclosure.

FIG. 2 is a diagram illustrating a structure of an outer layer according to an embodiment of the present disclosure, and FIG. 3 is a diagram illustrating prevention of damage of an outer layer by an impact according to an embodiment of the present disclosure.

Referring to FIGS. 2 and 3, the outer layer 30 according to the present embodiment may include an anti-fingerprint layer 31, anti-scratch layer 32, anti-reflective layer 33, polymer layer 34, adhesive layer 35, and glass layer 36.

The anti-fingerprint layer 31 can prevent a stain such as a user fingerprint from being stained on a surface of the anti-scratch layer 32. The anti-fingerprint layer 31 may be formed by coating a compound for preventing a fingerprint from being stained.

The anti-scratch layer 32 can prevent scratch from occurring on the polymer layer 34. For this reason, the anti-scratch layer 32 may have surface hardness of 2H (on the coating hardness scale) or more and have bending rigidity of a glass level. For example, even if the anti-scratch layer 32 is bent to 3 radius (R) or less in which the electronic device 100 may be bent in a complete circle, the anti-scratch layer 32 may have flexibility in which a crack does not occur. Thereby, the outer layer 30 according to the present embodiment can secure (provide) a quality similar to that of glass. The anti-scratch layer 32 may be formed by coating a compound at an upper surface of the polymer layer 34.

The anti-reflective layer 33 can prevent light reflection by the outer layer 30 or the display device 20. The anti-reflective layer 33 may be formed by coating a compound that suppresses light reflection at an upper surface of the polymer layer 34.

The polymer layer 34 may be a film sheet of a thin film of a polymer organic material. The polymer layer 34 according to the present embodiment may have a thickness between 0.025 to 0.2 thickness (T) mm. Further, the polymer layer 34 according to the present embodiment may have high transmittance of 88% or more, thermal resistance of 1000 or more, and a coefficient of thermal expansion of 80 e−6/K or less. Thereby, bending of the polymer layer 34 does not occur in a high temperature and high humidity environment or a thermal impact environment (e.g., within 100°) and the polymer layer 34 is prevented from being damaged. In other words, the polymer layer 34 may be made of a material having a small thermal expansion coefficient and having thermal stability. For example, the polymer layer 34 may be formed with polyimide (PI), (poly) norbornene, high heat resisting polyester (PET), epoxy, and urethane. Alternatively, the polymer layer 34 may be formed with a copolymer. For example, the polymer layer 34 may be formed with a copolymer in which polymethyl methacrylate (PMMA) and special PMMA are coupled, a copolymer in which polycarbonate (PC) and PI are coupled, a copolymer in which PMMA and PI are coupled, or a copolymer to which urethane is coupled.

The adhesive layer 35 may be made of an adhesive material disposed between the polymer layer 34 and the glass layer 36. The adhesive layer 35 can protect the glass layer 36 from an external impact. For example, as shown in FIG. 3, when a partial impact (e.g., pressing or stabbing of a screen by a pen) 37 occurs in the outer layer 30, the adhesive layer 35 may absorb at least a portion of the external impact to minimize the impact from being transferred to the glass layer 36.

The adhesive layer 35 may be formed with an optical clear adhesive (OCA), an optical clear resin (OCR), or a film in which the OCA and the OCR are mixed. The OCA may have light transmittance of 90% or more and have a thickness between 0.01 to 0.1 T. The OCA may generally have a Young's Modulus between 10 to 250 KPa. In this case, when using an OCA having a high Young's Modulus, the glass layer 36 may be protected from a strong impact, but a bending property may be deteriorated. For example, when folding and unfolding operations are repeated several hundred times to several thousand times, the OCA having a high Young's Modulus may be split. Accordingly, the adhesive layer 35 according to the present embodiment may be formed with an OCA having a Young's modulus between 10 to 100 KPa. Thereby, according to the present embodiment, the adhesive layer 35 can prevent the glass layer 36 from being damaged by an external impact and improve a folding life-span.

The OCR may have light transmittance of 90% or more and have a thickness between 0.02 to 0.05 T. The OCR may have a Young's Modulus between 10 to 100 KPa.

A film (e.g., AB film) in which the OCA and the OCR are mixed may be formed by simultaneously implementing the OCA and a pressure sensitive adhesive (PSA) at both surfaces of a film of a thin plate such as PET. When using a film in which the OCA and the OCR are mixed, reassembly and durability can be simultaneously enhanced. According to an embodiment, the adhesive layer 35 may include at least one of the optically transparent OCA, OCR, and film in which the OCA and the OCR are mixed.

The glass layer 36 is thin plate glass. For example, the glass layer 36 may have a thickness between 0.025 to 0.2 mm. The glass layer 36 may include a first portion in the first rigid portion 11 and a second portion in the flexible portion 13. The first portion of the glass layer 36 may have substantially almost the same thickness as that of a second portion of the glass layer 36. Further, the glass layer 36 further includes a third portion in the second rigid portion 12, and the third portion of the glass layer 36 may have substantially almost the same thickness as that of the second portion of the glass layer 36.

The glass layer 36 may be produced with a slimming construction method of chemically (etching) cutting thick glass, a fusion construction method of a surface non-contact method of forming a glass substrate by dropping and cooling a glass solution in the air, and a roller construction method of flowing and extruding a glass solution between two rollers. Further, the glass layer 36 may be produced with various known methods.

The glass layer 36 according to the present embodiment may have a Young's modulus of 50 MPa or more. Thereby, by reinforcing bending strength of the polymer layer 34, the glass layer 36 according to the present embodiment may maintain surface hardness by resisting to stabbing or pressing when partial stabbing or pressing occurs, and when a user touches the glass layer 36, the glass layer 36 can improve sensory sensitivity.

Here, the polymer layer 34, the adhesive layer 35, and the glass layer 36 may be coupled through a lamination process. The lamination process may include a first process of laminating a film or liquid type adhesive (e.g., OCA, OCR) at one surface (e.g., a rear surface) of the polymer layer 34; a second process of laminating the glass layer 36 at a film generated through the first process; and a third process of autoclaving the outer layer 30 generated through the second process. For example, in the first process, the polymer layer 34 is attached in a guided state to a receiving jig through vacuum pressing, the adhesive layer 35 is attached to correspond to a guide to a moving jig attached to an upper plate or a moving shaft of the receiving jig, and by performing a vertical or rotation movement of the moving jig, the polymer layer 34 and the adhesive layer 35 may be coupled (laminated). In the second process, the glass layer 36 is attached in a guided state to the receiving jig through vacuum pressing, a film (the polymer layer 34+the adhesive layer 35) generated through the first process is attached to correspond to the guide to a moving jig attached to an upper plate or a moving shaft, and by performing a vertical or rotation movement, the polymer layer 34, the adhesive layer 35, and the glass layer 36 may be coupled (laminated). The third process is a process of storing the generated outer layer 30 at a chamber of a high temperature and high pressure for a predetermined time or more. Bubbles existing between each layer may be removed through the third process, and adhesive strength can be enhanced.

According to an embodiment, in the outer layer 30, at least one of the anti-fingerprint layer 31, the anti-scratch layer 32, and the anti-reflective layer 33 may be omitted. Further, stacking order of the anti-fingerprint layer 31, the anti-scratch layer 32, and the anti-reflective layer 33 may be changed. Further, the outer layer 30 may further include at least one functional layer such as a fogging prevention layer.

Figure 4A:
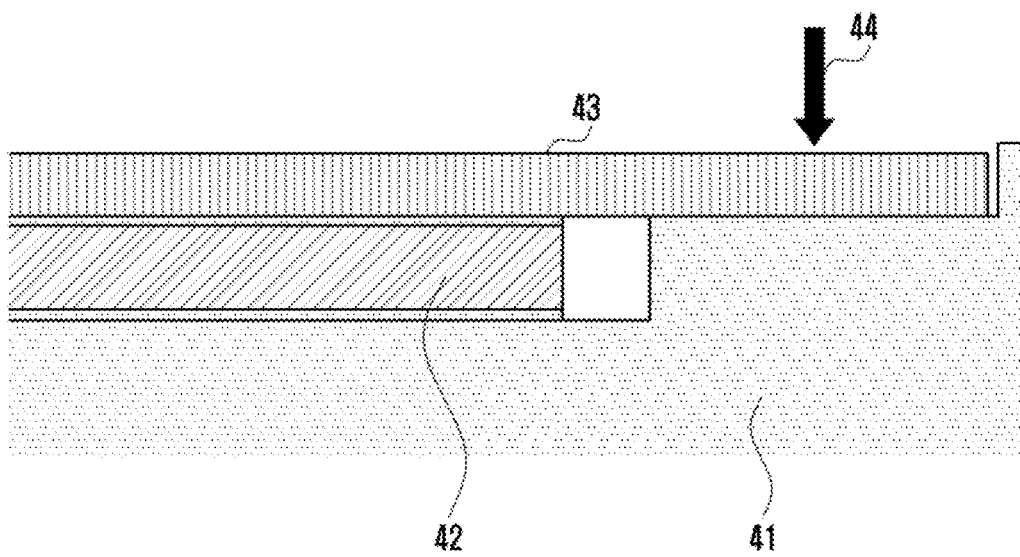
FIG. 4A is a diagram illustrating a coupling structure of a window in an electronic device according to the related art.
Figure 4B:
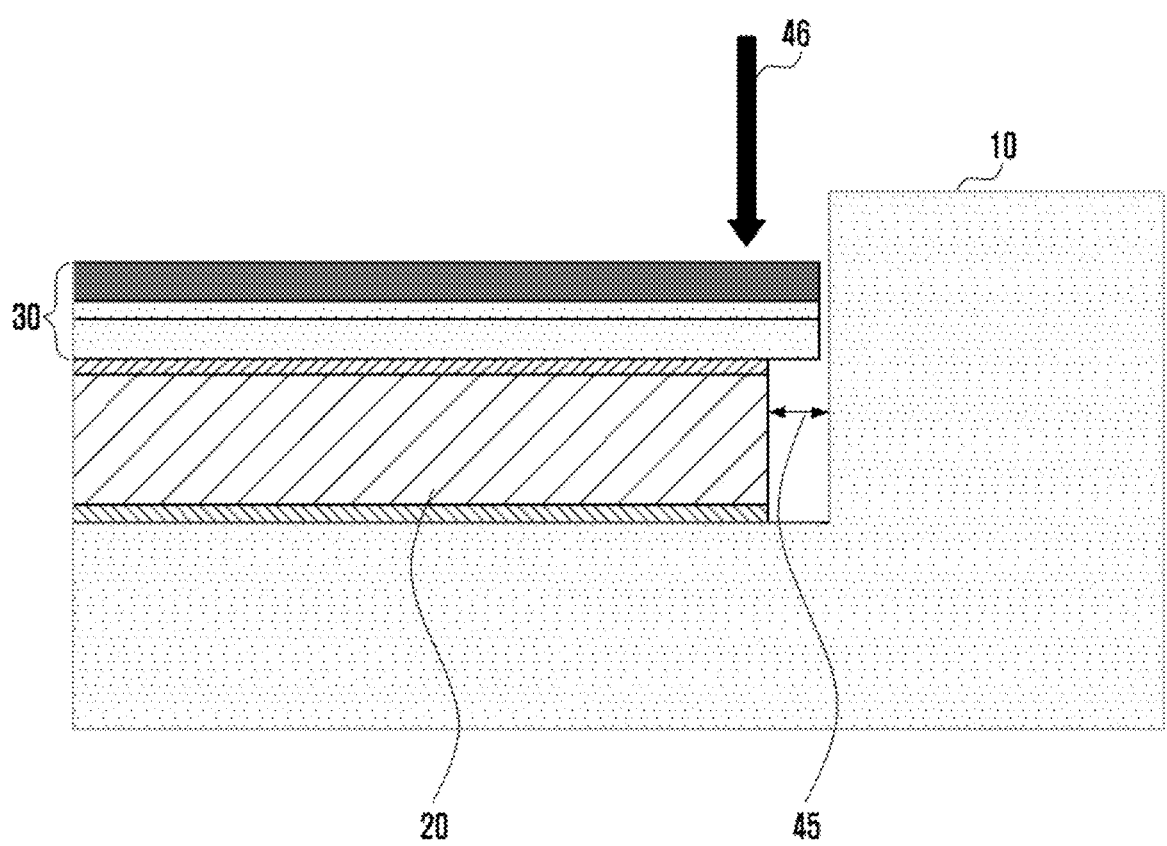
FIG. 4B is a diagram illustrating an example of a coupling structure of an outer layer according to an embodiment of the present disclosure.

FIG. 4A is a diagram illustrating a coupling structure of a window in an electronic device according to the related art, and FIG. 4B is a diagram illustrating an example of a coupling structure of an outer layer according to an embodiment of the present disclosure.

Referring to FIG. 4A, in an electronic device of the related art, a window 43 that covers a display 42 may be bonded to a portion of a housing 41. In other words, in an electronic device of the related art, a portion of the window 43 may be received in the housing 10. In the electronic device of the related art, when an impact 44 is applied on the window 43 received in the housing 41, the window 43 may be easily broken. This is because the housing 41 that supports the window 43 is a hard material not to distribute or absorb an impact 44 and thus an entire impact is applied to the window 43.

Referring to FIG. 4B, in the electronic device 100 according to the present embodiment, the outer layer 30 and the housing 10 are not overlapped. The outer layer 30 is not received in the housing 10. Thereby, an impact 46 applied to the outer layer 30 may be mitigated (distributed or absorbed) by a flexible display device 20 having lower strength than that of the housing 10. Thereby, in the present embodiment, the outer layer 30 can be prevented from being damaged by the external impact 46.

By minimizing a tolerance 45 between the display device 20 and the housing 10, for example by minimizing a portion of the outer layer 30 that is not supported by the display device 20, damage of the outer layer 30 can be prevented or minimized. This is because when a portion that is not supported by the display device 20 is pressed, the outer layer 30 may be moved and damaged in an impact direction. For example, the tolerance 45 may be 0.25 mm or less.

Figure 5:
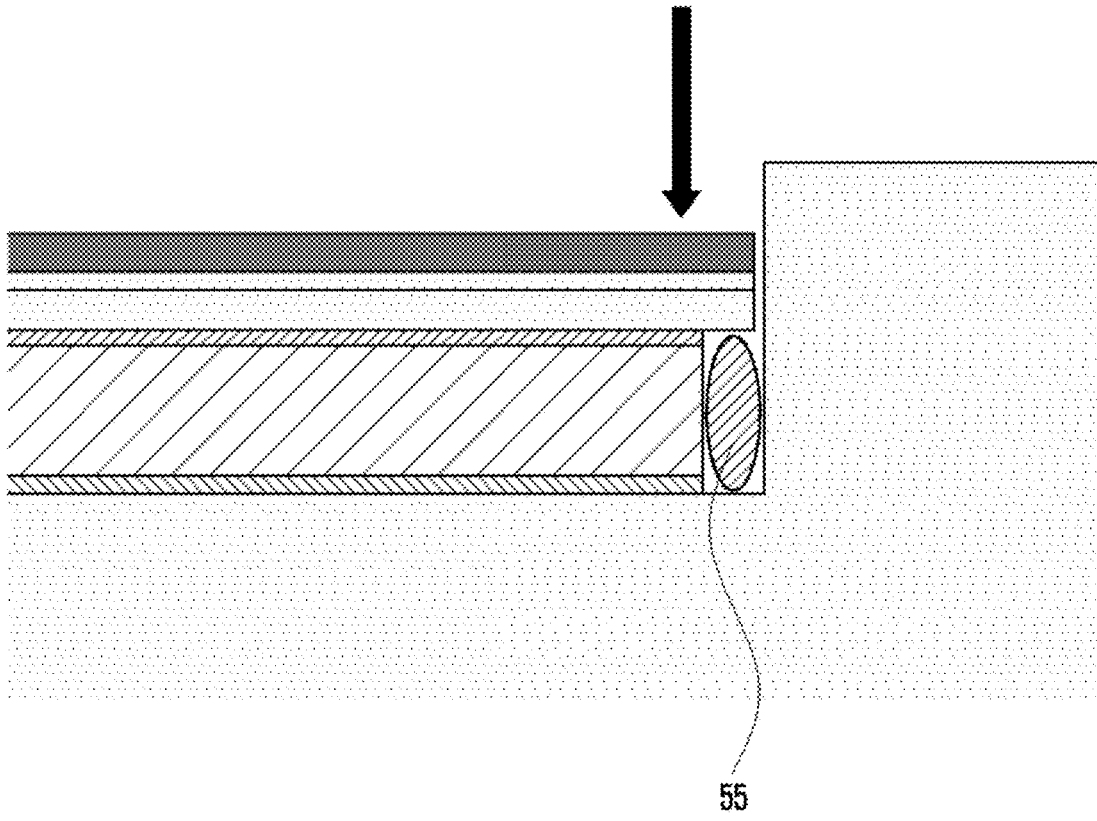
FIG. 5 is a diagram illustrating another example of a coupling structure of an outer layer according to an embodiment of the present disclosure.

FIG. 5 is a diagram illustrating another example of a coupling structure of an outer layer according to an embodiment of the present disclosure.

Referring to FIG. 5, an electronic device according to the present embodiment may have a structure similar to that of FIG. 4B. At a rear surface of a portion of the outer layer 30 that is not supported by the display device 20, a support 55 for supporting the outer layer 30 may be added. For example, in the present embodiment, by injecting a resin or an ultraviolet-curable resin into a rear surface of a portion of the outer layer 30 that is not supported by the display device 20, the support 55 may be added.

Figure 6:
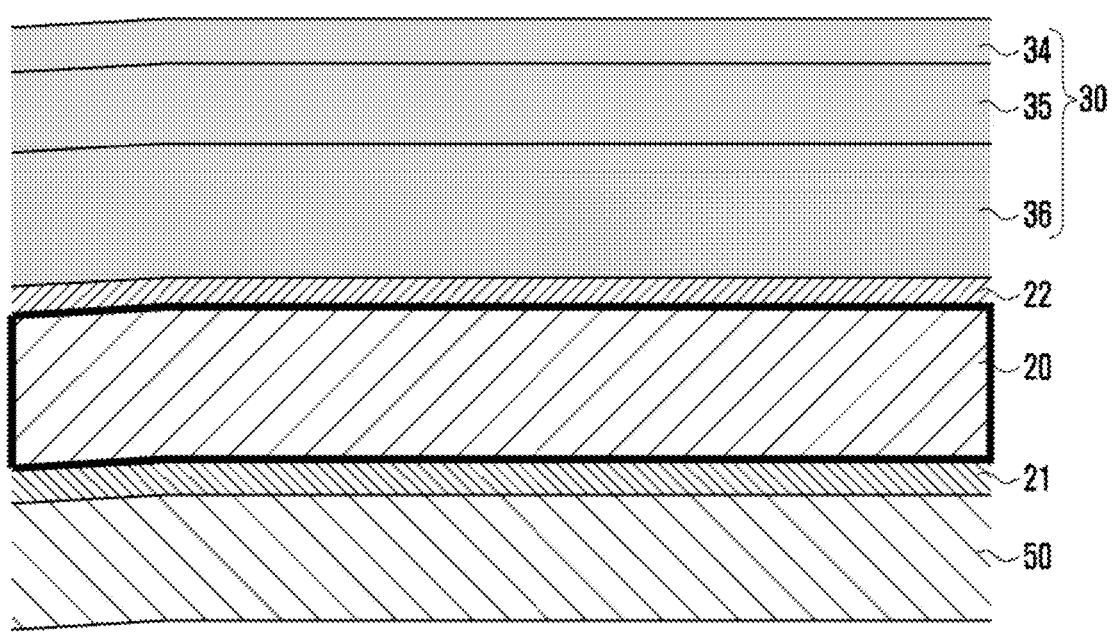
FIG. 6 is a cross-sectional view illustrating an internal structure of an electronic device when being bent according to an embodiment of the present disclosure.

FIG. 6 is a cross-sectional view illustrating an internal structure of an electronic device when being bent according to an embodiment of the present disclosure.

Referring to FIG. 6, when an electronic device according to various embodiments of the present disclosure is bent, a bracket 50 to which the display device 20 is attached may operate as a neutral plane in which a length does not increase or decrease. In the display device 20 and the outer layer 30 disposed at an upper portion of the bracket 50, a tensile stress that increases a length is applied. In this case, because the glass layer 36 is a rigid body, compared with the display device 20 and the polymer layer 34, a tensile stress is not applied to the glass layer 36, and at an interface between the glass layer 36 and the display device 20 and an interface between the glass layer 36 and the polymer layer 34, slip may be applied. Therefore, an adhesive layer 22 located between the glass layer 36 and the display device 20 and the adhesive layer 35 located between the glass layer 36 and the polymer layer 34 should be made of a material that may slip. Similarly, slip may occur between the bracket 50 and the display device 20. Therefore, an adhesive material (e.g., a double-sided adhesive tape 21) disposed between the bracket 50 and the display device 20 may be also made of a material that may slip.

In the foregoing embodiment of the present disclosure, life-span deterioration of the outer layer 30 by slip occurring when an electronic device is folded can be solved.

Figure 7:
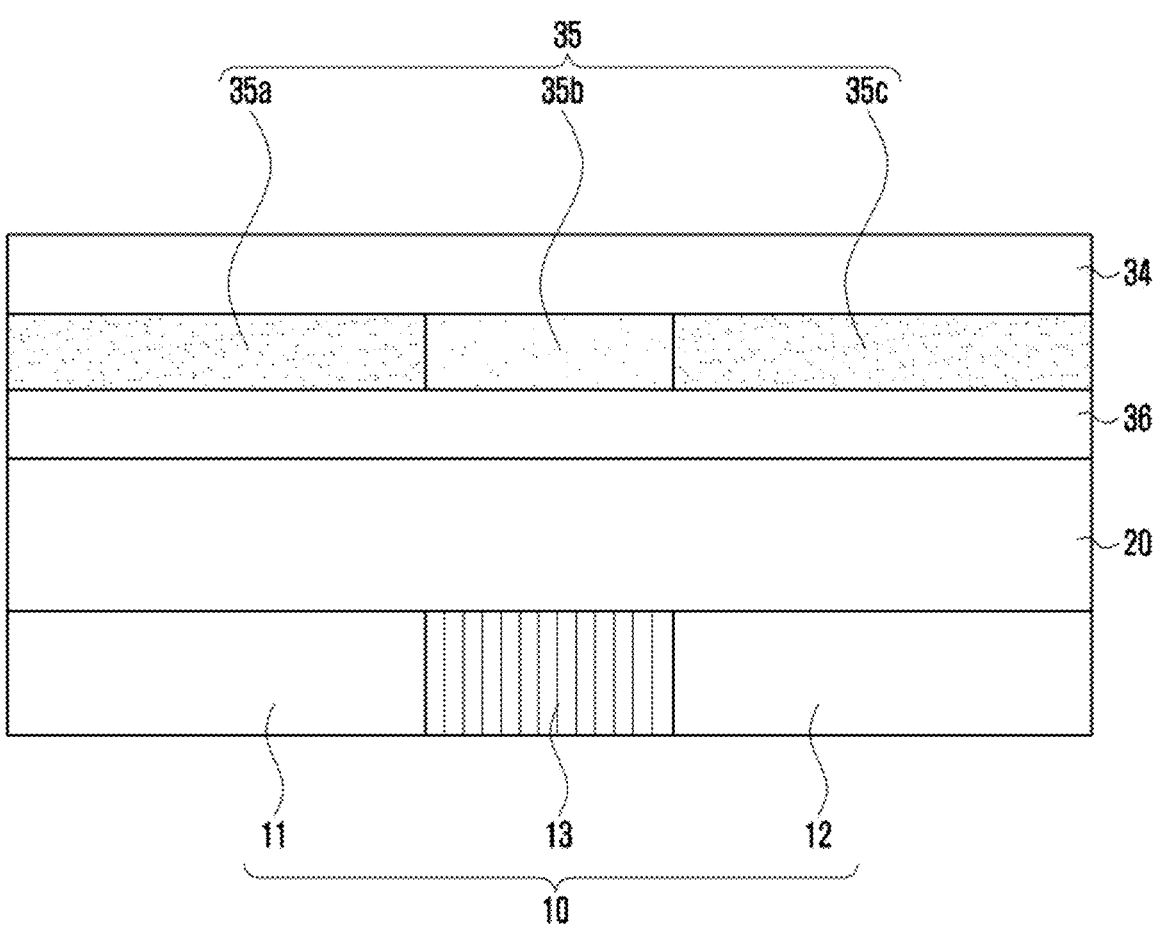
FIG. 7 is a diagram illustrating a structure of an adhesive layer of an electronic device according to an embodiment of the present disclosure.

FIG. 7 is a diagram illustrating a structure of an adhesive layer of an electronic device according to an embodiment of the present disclosure.

Referring to FIG. 7, in an electronic device according to various embodiments of the present disclosure, the adhesive layer 35 is divided into at least two portions, and each portion may have different adhesive strength. For example, as shown in FIG. 7, the adhesive layer 35 may include a first adhesive layer 35a, second adhesive layer 35b, and third adhesive layer 35c. The first adhesive layer 35a may be located to correspond to the first rigid portion 11, the second adhesive layer 35b may be located to correspond to the flexible portion 13, and the third adhesive layer 35c may be located to correspond to the second rigid portion 12.

The first adhesive layer 35a and the third adhesive layer 35c may have a Young's Modulus of 200 KPa or more, and the second adhesive layer 35b may have a Young's Modulus between 10 to 100 KPa. Therefore, according to the present embodiment, in order to improve surface strength, the first adhesive layer 35a and the third adhesive layer 35c of a portion that is not bent have a high Young's Modulus, and in order to improve a bending property, the second adhesive layer 35b of a bent portion may have a relatively low Young's Modulus. Thereby, in the present embodiment, while securing a bending life-span of a folded portion (e.g., the second adhesive layer 35b), an impact property of a portion (e.g., the first adhesive layer 35a and the third adhesive layer 35c) that is not folded can be improved.

Figure 8:
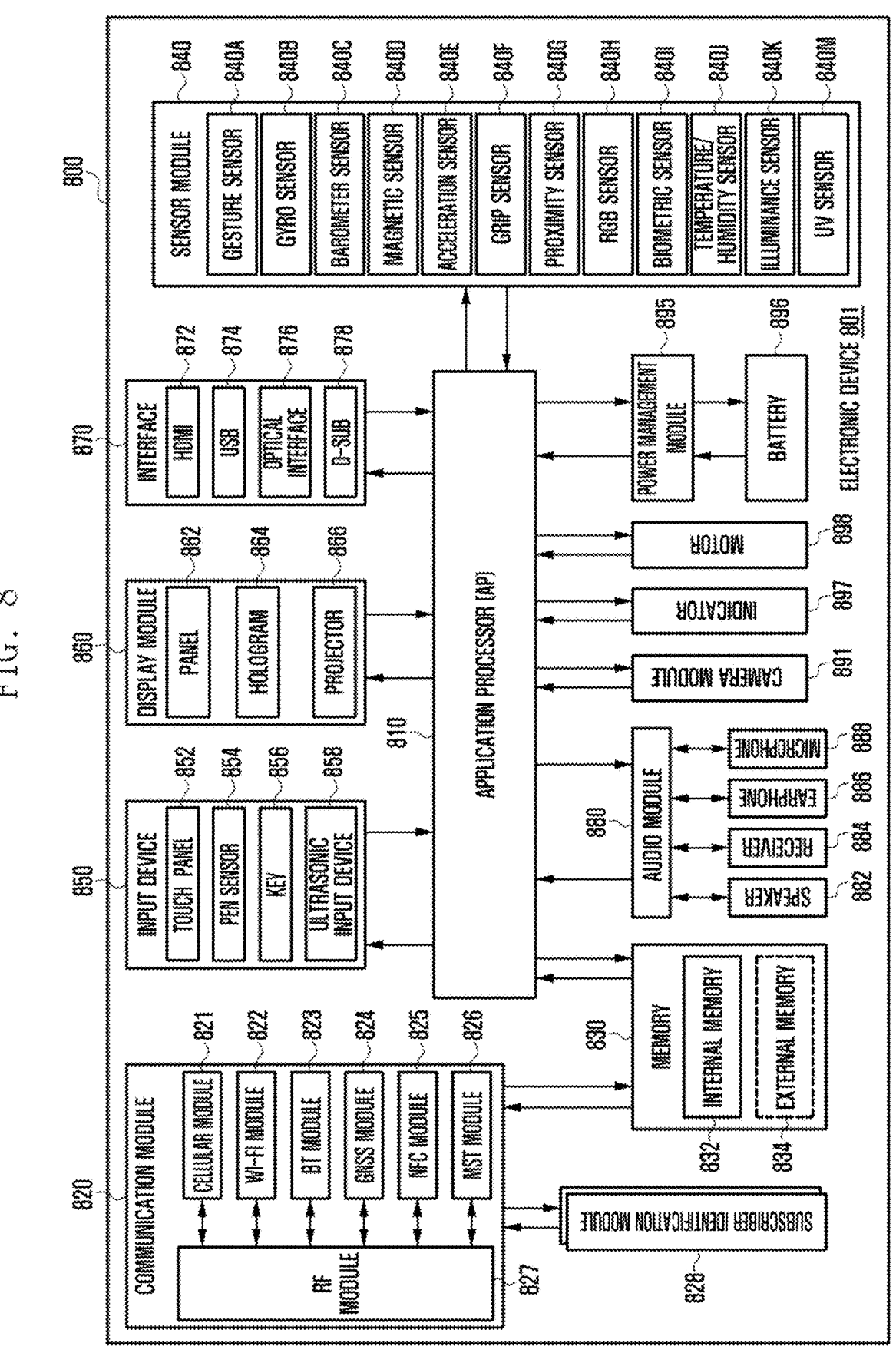
FIG. 8 is a block diagram illustrating a configuration of an electronic device according to various embodiments of the present disclosure Throughout the drawings, it should be noted that like reference numbers are used to depict the same or similar elements, features, and structures.

FIG. 8 is a block diagram showing a configuration of an electronic device according to various embodiments of the present disclosure. The electronic device 800 may include one or more processors 810 (e.g., APs), a communication module 820, a subscriber identification module (SIM) 828, a memory 830, a sensor module 840, an input device 850, a display 860, an interface 870, an audio module 880, a camera module 891, a power management module 895, a battery 896, an indicator 897, and a motor 898.

Referring to FIG. 8, the processor 810 is capable of driving, for example, an operating system or an application program to control a plurality of hardware or software components connected to the processor 810, processing various data, and performing operations. The processor 810 may be implemented as, for example, a system on chip (SoC). The processor 810 may further include a graphics processing unit (GPU) and/or an image signal processor (ISP). The processor 810 is capable of loading commands or data received from at least one of other components (e.g., a non-volatile memory) on a volatile memory, processing the loaded commands or data. The processor 810 is capable of storing various data in a non-volatile memory.

The communication module 820 is capable of including a cellular module 821, a WiFi module 822, a Bluetooth (BT) module 823, a global navigation satellite system (GNSS) module 824 (e.g., a GPS module, Glonass module, Beidou module or Galileo module), a near field communication (NFC) module 825, an MST module 826, and a radio frequency (RF) module 827.

The cellular module 821 is capable of providing a voice call, a video call, an SMS service, an Internet service, etc., through a communication network, for example. According to an embodiment, the cellular module 821 is capable of identifying and authenticating an electronic device in a communication network by using a SIM 828 (e.g., a SIM card). According to an embodiment, the cellular module 821 is capable of performing at least part of the functions provided by the processor 810. According to an embodiment, the cellular module 821 is also capable of including a communication processor (CP).

Each of the WiFi module 822, the BT module 823, the GNSS module 824, and the NFC module 825 is capable of including a processor for processing data transmitted or received through the corresponding module. According to various embodiments, at least part of the cellular module 821, WiFi module 822, BT module 823, GNSS module 824, and NFC module 825 (e.g., two or more modules) may be included in one integrated chip (IC) or one IC package.

The RF module 827 is capable of transmission/reception of communication signals, e.g., RF signals. The RF module 827 is capable of including a transceiver, a power amp module (PAM), a frequency filter, a low noise amplifier (LNA), an antenna, etc. According to another embodiment, at least one of the following modules: cellular module 821, WiFi module 822, BT module 823, GNSS module 824, and NFC module 825 is capable of transmission/reception of RF signals through a separate RF module.

The SIM 828 is capable of including a card including a SIM and/or an embodied SIM. The SIM 828 is also capable of containing unique identification information, e.g., integrated circuit card identifier (ICCID), or subscriber information, e.g., international mobile subscriber identity (IMSI).

The memory 830 is capable of including a built-in memory 832 or an external memory 834. The built-in memory 832 is capable of including at least one of the following: a volatile memory, e.g., a dynamic random access memory (DRAM), a static RAM (SRAM), a synchronous dynamic RAM (SDRAM), etc.; and a non-volatile memory, e.g., a one-time programmable read only memory (OT-PROM), a programmable ROM (PROM), an erasable and programmable ROM (EPROM), an electrically erasable and programmable ROM (EEPROM), a mask ROM, a flash ROM, a flash memory (e.g., a NAND flash memory, an NOR flash memory, etc.), a hard drive, a solid state drive (SSD), etc.

The external memory 834 is also capable of including a flash drive, e.g., a compact flash (CF), a secure digital (SD), a micro-SD, a mini-SD, an extreme digital (xD), a multi-media card (MMC), a memory stick, etc. The external memory 834 is capable of being connected to the electronic device, functionally and/or physically, through various interfaces.

The sensor module 840 is capable of measuring/detecting a physical quantity or an operation state of the electronic device, and converting the measured or detected information into an electronic signal. The sensor module 840 is capable of including at least one of the following: a gesture sensor 840A, a gyro sensor 840B, a barometer (atmospheric pressure) sensor 840C, a magnetic sensor 840D, an acceleration sensor 840E, a grip sensor 840F, a proximity sensor 840G, an RGB (color) sensor 840H (e.g., a red, green and blue (RGB) sensor), a biometric sensor 840I, a temperature/humidity sensor 840J, an illuminance sensor 840K, and a ultraviolet (UV) sensor 840M. Additionally or alternatively, the sensor module 840 is capable of further including an E-nose sensor, an electromyography (EMG) sensor, an electroencephalogram (EEG) sensor, an electrocardiogram (ECG) sensor, an infrared (IR) sensor, an iris sensor and/or a fingerprint sensor. The sensor module 840 is capable of further including a control circuit for controlling one or more sensors included therein. In various embodiments, the electronic device 800 is capable of including a processor, configured as part of the processor 810 or a separate component, for controlling the sensor module 840. In this case, while the processor 810 is operating in sleep mode, the processor is capable of controlling the sensor module 840.

The input device 850 is capable of including a touch panel 852, a (digital) pen sensor 854, a key 856, or an ultrasonic input unit 858. The touch panel 852 may be implemented with at least one of the following: a capacitive touch system, a resistive touch system, an infrared touch system, and an ultrasonic touch system. The touch panel 852 may further include a control circuit. The touch panel 852 may also further include a tactile layer to provide a tactile response to the user.

The (digital) pen sensor 854 may be implemented with a part of the touch panel or with a separate recognition sheet. The key 856 may include a physical button, an optical key, or a keypad. The ultrasonic input unit 858 is capable of detecting ultrasonic waves, created in an input tool, through a microphone 888, and identifying data corresponding to the detected ultrasonic waves.

The display 860 is capable of including a panel 862, a hologram unit 864, or a projector 866. The panel 862 may be implemented to be flexible, transparent, or wearable. The panel 862 may also be incorporated into one module together with the touch panel 852. The hologram unit 864 is capable of showing a stereoscopic image in the air by using light interference. The projector 866 is capable of displaying an image by projecting light onto a screen. The screen may be located inside or outside of the electronic device 800. According to an embodiment, the display 860 may further include a control circuit for controlling the panel 862, the hologram unit 864, or the projector 866.

The interface 870 is capable of including a high-definition multimedia interface (HDMI) 872, a universal serial bus (USB) 874, an optical interface 876, or a D-subminiature (D-sub) 878. Additionally or alternatively, the interface 870 is capable of including a mobile high-definition link (MHL) interface, a SD card/MMC interface, or an infrared data association (IrDA) standard interface.

The audio module 880 is capable of providing bidirectional conversion between a sound and an electronic signal. The audio module 280 is capable of processing sound information input or output through a speaker 882, a receiver 884, earphones 886, microphone 888, etc.

The camera module 891 refers to a device capable of taking both still and moving images. According to an embodiment, the camera module 891 is capable of including one or more image sensors (e.g., a front image sensor or a rear image sensor), a lens, an ISP, a flash (e.g., a light emitting diode (LED) or xenon lamp), etc.

The power management module 895 is capable of managing power of the electronic device 801. According to an embodiment, the power management module 895 is capable of including a power management integrated circuit (PMIC), a charger IC, or a battery or fuel gauge. The PMIC may employ wired charging and/or wireless charging methods. Examples of the wireless charging method are magnetic resonance charging, magnetic induction charging, and electromagnetic charging. To this end, the PIMC may further include an additional circuit for wireless charging, such as a coil loop, a resonance circuit, a rectifier, etc. The battery gauge is capable of measuring the residual capacity, charge in voltage, current, or temperature of the battery 896. The battery 896 takes the form of either a rechargeable battery or a solar battery.

The indicator 897 is capable of displaying a specific status of the electronic device 800 or a part thereof (e.g., the processor 810), e.g., a boot-up status, a message status, a charging status, etc. The motor 898 is capable of converting an electrical signal into mechanical vibrations, such as, a vibration effect, a haptic effect, etc. Although not shown, the electronic device 800 is capable of further including a processing unit (e.g., GPU) for supporting a mobile TV. The processing unit for supporting a mobile TV is capable of processing media data pursuant to standards, e.g., digital multimedia broadcasting (DMB), digital video broadcasting (DVB), or mediaFlo™, etc.

The term "module" as used herein may be defined as, for example, a unit including one of hardware, software, and firmware or two or more combinations thereof. The term "module" may be interchangeably used with, for example, the terms "unit", "logic", "logical block", "component", or "circuit", and the like. The "module" may be a minimum unit of an integrated component or a part thereof. The "module" may be a minimum unit performing one or more functions or a part thereof. The "module" may be mechanically or electronically implemented. For example, the "module" may include at least one of an application-specific integrated circuit (ASIC) chip, field-programmable gate arrays (FPGAs), or a programmable-logic device, which is well known or will be developed in the future, for performing certain operations.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
a housing including a first housing portion, a second housing portion, and a third housing portion located between the first housing portion and the second housing portion, the third housing portion configured to facilitate folding of the housing by allowing the first housing portion and the second housing portion to rotate toward each other;
a flexible display including a first display portion accommodated in the first housing portion, a second display portion accommodated in the second housing portion, and a third display portion accommodated in the third housing portion, the flexible display accommodated in the housing such that a side surface of the flexible display is spaced apart from an inner surface of a sidewall of the housing; and
an outer layer disposed over the first, second and third display portions of the flexible display and including a glass layer and a polymer layer attached to each other via a first adhesive layer located therebetween, the first adhesive layer including a first adhesive portion corresponding to the first housing portion and having a first adhesive strength, a second adhesive portion corresponding to the second housing portion and having a second adhesive strength and a third adhesive portion corresponding to the third housing portion and having a third adhesive strength lower than the first adhesive strength and the second adhesive strength,
wherein an edge area of the outer layer extends further than the flexible display toward the inner surface of the sidewall of the housing.

2. The electronic device of claim 1, wherein a bending property of the third adhesive portion is higher than that of each of the first adhesive portion and the second adhesive portion.

3. The electronic device of claim 1, wherein the first adhesive portion has a first Young's modulus, the second adhesive portion has a second Young's modulus, and the third adhesive portion has a third Young's modulus lower than each of the first Young's modulus and the second Young's modulus.

4. The electronic device of claim 3, wherein at least one of the first Young's modulus or the second Young's modulus is substantially equal to or higher than 200 KPa.

5. The electronic device of claim 3, wherein the third Young's modulus is substantially in a range between 10 KPa and 100 KPa.

6. The electronic device of claim 3, wherein the glass layer has a fourth Young's modulus greater than each of the first Young's modulus, the second Young's modulus and the third Young's modulus.

7. The electronic device of claim 1,
wherein the first housing portion and the second housing portion are rigid portions, and
wherein the third housing portion is a flexible portion configured to facilitate the folding of the housing.

8. The electronic device of claim 1, further comprising:
a second adhesive layer,
wherein the outer layer and the flexible display are attached to each other via the second adhesive layer.

9. The electronic device of claim 8,
wherein the second adhesive layer and the first adhesive layer are made of a same material, and
wherein the material allows slippage between the flexible display and the housing.

10. The electronic device of claim 8, further comprising:
a third adhesive layer,
wherein the flexible display and the housing are attached to each other via the third adhesive layer, and
wherein the third adhesive layer comprises a material that allows slippage between the flexible display and the housing.

11. The electronic device of claim 10, wherein the third adhesive layer comprises a double-sided adhesive tape.

12. The electronic device of claim 1, wherein the first adhesive strength is substantially the same as the second adhesive strength.

13. The electronic device of claim 1, wherein the outer layer is accommodated in the housing such that the edge area of the outer layer is spaced apart from the inner surface of the sidewall of the housing.

14. The electronic device of claim 13, wherein a first gap between the side surface of the flexible display and the inner surface of the sidewall of the housing is larger than a second gap between the edge area of the outer layer and the inner surface of the sidewall of the housing.

15. The electronic device of claim 1, wherein the polymer layer comprises at least one of polyimide (PI), norbornene, high heat resisting polyester, epoxy, urethane, a copolymer in which polymethyl methacrylate (PMMA) and special PMMA are coupled, a copolymer in which polycarbonate (PC) and PI are coupled, a copolymer in which PMMA and PI are coupled, or a copolymer to which urethane is coupled.

16. An electronic device comprising:

a housing including a first housing portion, a second housing portion, and a third housing portion located between the first housing portion and the second housing portion, the third housing portion configured to facilitate folding of the housing;

a flexible display including a first display portion accommodated in the first housing portion, a second display portion accommodated in the second housing portion, and a third display portion accommodated in the third housing portion, the flexible display accommodated in the housing; and an outer layer disposed over the first, second and third display portions of the flexible display and including a glass layer and a polymer layer attached to each other via an adhesive layer located therebetween, the adhesive layer including a first adhesive portion corresponding to the first housing portion and having a first adhesive strength, a second adhesive portion corresponding to the second housing portion and having a second adhesive strength and a third adhesive portion corresponding to the third housing portion and having a third adhesive strength lower than the first adhesive strength and the second adhesive strength, wherein an edge area of the outer layer extends further than the flexible display toward an inner surface of a sidewall of the housing.

17. The electronic device of claim 16, wherein a bending property of the third adhesive portion is higher than that of each of the first adhesive portion and the second adhesive portion.

18. The electronic device of claim 16, wherein the first adhesive portion has a first Young's modulus, the second adhesive portion has a second Young's modulus, and the third adhesive portion has a third Young's modulus lower than each of the first Young's modulus and the second Young's modulus.

* * * * *